(12) United States Patent
Tominaga

(10) Patent No.: US 10,656,476 B2
(45) Date of Patent: May 19, 2020

(54) LIQUID CRYSTAL PANEL

(71) Applicant: SHARP KABUSHIKI KAISHA, Sakai, Osaka (JP)

(72) Inventor: Masakatsu Tominaga, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/202,030

(22) Filed: Nov. 27, 2018

(65) Prior Publication Data

US 2019/0163024 A1 May 30, 2019

(30) Foreign Application Priority Data

Nov. 29, 2017 (JP) .................................. 2017-229055

(51) Int. Cl.
*G02F 1/1339* (2006.01)
*G02F 1/1343* (2006.01)
*G02F 1/1337* (2006.01)

(52) U.S. Cl.
CPC ...... *G02F 1/134309* (2013.01); *G02F 1/1337* (2013.01); *G02F 1/1339* (2013.01); *G02F 1/13394* (2013.01); *G02F 1/13439* (2013.01); *G02F 1/134363* (2013.01); *G02F 2001/13398* (2013.01); *G02F 2001/134372* (2013.01);
(Continued)

(58) Field of Classification Search
CPC .......... G02F 1/13394; G02F 1/136286; G02F 1/1368; G02F 1/13338; G02F 1/133512; G02F 1/133514; G02F 1/1339; G02F 1/133345; G02F 1/134309; G02F 1/134363; G02F 1/13439; G02F 1/1345; G02F 1/13452; G02F 1/136227; G02F 1/1337; G02F 1/133753; G02F 1/133707; G02F 1/134336; G02F 1/1362; G02F 1/133528; G02F 1/1343; G02F 1/13454; G02F 1/1333; G02F 1/1335; G02F 1/133509; G02F 2001/13398; G02F 2001/134372; G02F 2001/134345; G02F 2001/133388; G02F 2001/134381; G02F 2001/134318; G02F 2001/133357; G02F 2201/121; G02F 2201/40; G02F 2201/12; G02F 2202/16; G02F 2202/22; G09G 3/3655; G09G 2300/0426
See application file for complete search history.

(56) References Cited

U.S. PATENT DOCUMENTS

| 2009/0109356 A1* | 4/2009 | Kitagawa .......... G02F 1/134363 349/33 |
| 2017/0153518 A1* | 6/2017 | Tang .................... G02F 1/13439 |

FOREIGN PATENT DOCUMENTS

JP    2002-258306 A    9/2002

* cited by examiner

Primary Examiner — Thoi V Duong
(74) Attorney, Agent, or Firm — ScienBiziP, P.C.

(57) ABSTRACT

A liquid crystal panel includes a first substrate, a second substrate, a liquid crystal layer disposed between the first substrate and the second substrate, and a spacer. The first substrate includes pixel electrodes and a common electrode overlapping the pixel electrodes. The second substrate has a display surface displaying an image thereon and is arranged opposite the first substrate and includes a transparent electrode overlapping the common electrode. The spacer has conductivity and is disposed in a display region where the image is displayed and between the first substrate and the second substrate and contacted with the common electrode and the transparent electrode.

7 Claims, 15 Drawing Sheets

(52) U.S. Cl.
CPC ............ *G02F 2001/134381* (2013.01); *G02F 2201/121* (2013.01); *G02F 2201/123* (2013.01); *G02F 2202/16* (2013.01)

LIQUID CRYSTAL PANEL

CROSS REFERENCE TO RELATED APPLICATION

This application claims priority from Japanese Patent Application No. 2017-229055 filed on Nov. 29, 2017. The entire contents of the priority application are incorporated herein by reference.

TECHNICAL FIELD

The technology described herein relates to a liquid crystal panel.

BACKGROUND

There has been a liquid crystal panel including a common electrode that covers pixels. In such a liquid crystal panel, an electric field is created between pixel electrodes and the common electrode to control alignment of liquid crystals.

In the liquid crystal panel including the common electrode, signal delay of a common signal may be caused due to resistance (sheet resistivity) of the common electrode and display quality may be lowered.

SUMMARY

The technology described herein was made in view of the above circumstances and an object is to achieve less occurrence of signal delay of a common signal and improve display quality.

To solve the above problems, a liquid crystal panel according to the present technology includes a first, substrate, a second substrate, a liquid crystal layer disposed between the first substrate and the second substrate, and a spacer. The first substrate includes pixel electrodes and a common electrode overlapping the pixel electrodes. The second substrate has a display surface displaying an image thereon and is arranged opposite the first substrate and includes a transparent electrode overlapping the common electrode. The spacer has conductivity and is disposed in a display region where the image is displayed and between the first substrate and the second substrate and contacted with the common electrode and the transparent electrode.

The common electrode and the transparent electrode are connected to each other with the conductive spacer such that the transparent electrode on the second substrate side can be used as the common electrode. According to such a configuration, compared to a configuration including only the common electrode on the first substrate side, the resistance of the common electrode can be lowered. As a result, signal delay of the common signal is less likely to be caused and display quality can be further improved. The second substrate including the transparent electrode is less likely to be charged with static electricity and the alignment of the liquid crystals in the liquid crystal layer is less likely to be disturbed.

According to the technology described herein, signal delay of a common signal is less likely to be caused and display quality is further improved.

BRIEF DESCRIPTION OF THE DRAWINGS

FIG. 6 is a plan view illustrating pixels of an array substrate according to a third embodiment.

DETAILED DESCRIPTION

First Embodiment

Figure 1:
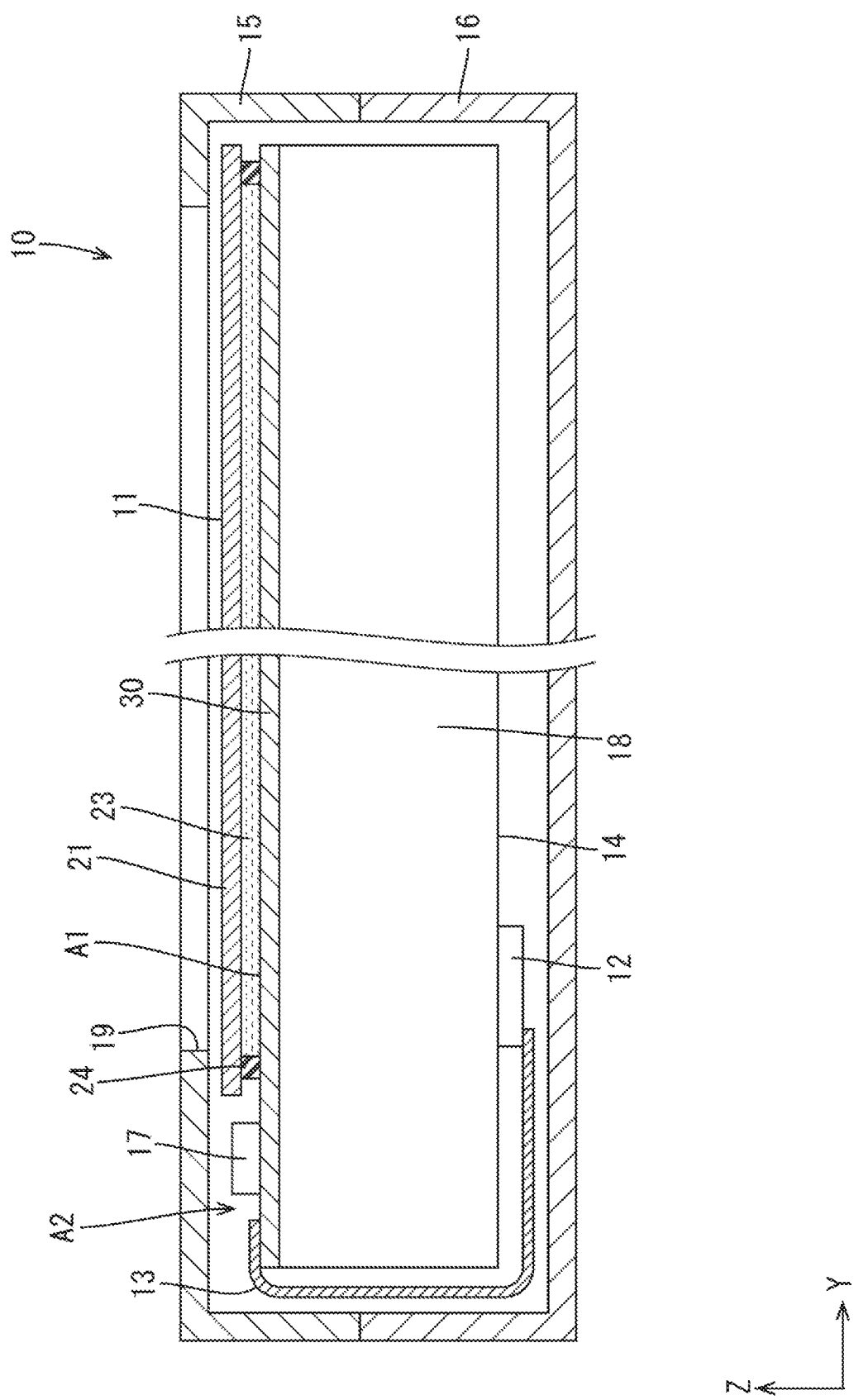
FIG. 1 is a schematic cross-sectional view illustrating a liquid crystal panel according to a first embodiment.

A first embodiment according to the present technology will be described with reference to FIGS. 1 to 6. As illustrated in FIG. 1, a liquid crystal display device 10 includes a liquid crystal panel 11 (a display panel), a control circuit board 12 (an external signal supply source) that supplies various kinds of input signals to a driver 17 of the liquid crystal panel 11, a flexible circuit board 13 (an external connection component) that electrically connects the liquid crystal panel 11 and the external control circuit board 12, and a backlight unit 14 (a lighting unit) that is an external light source supplying light to the liquid crystal panel 11. As illustrated in FIG. 1, the backlight unit 14 includes a chassis 18 having a substantially box shape that opens toward a front side (toward the liquid crystal panel 11), a light source (such as a cold cathode tube, an LED, an organic EL, which is not illustrated) arranged within the chassis 18, and an optical member (not illustrated) that covers an opening of the chassis 18. The optical member has a function of converting light rays emitted by the light source into planar light. The liquid crystal panel 11 includes a display region A1 where an image is displayed and a non-display region A2 that surrounds the display region A1.

As illustrated in FIG. 1, the liquid crystal display device 10 includes a pair of front and back side exterior members 15, 16 where the liquid crystal panel 11 and the backlight unit 14 are arranged. The front side exterior member 15 has an opening 19 through which an image displayed on the display region A1 of the liquid crystal panel 11 can be seen from outside. The liquid crystal display device 10 according to this embodiment may be included in various kinds of electronic devices such as liquid crystal televisions, mobile phones (including smartphones), notebook computers (including tablet computers), wearable terminals (including smart watches), handheld terminals (including electronic books and PDAs), portable video game players, and digital photo frames.

As illustrated in FIG. 1, the liquid crystal panel 11 includes a pair of substrates 21, 30 that are opposite each other, a liquid crystal layer 23 (a medium layer) containing liquid crystal molecules, which are substances that change optical characteristics when electromagnetic field is applied, and a sealing member 24 that is between the substrates 21 and 30 and surrounds the liquid crystal layer 23 to seal the liquid crystal layer 23. One of the substrates 21, 30 on the front (a front surface side, on an upper side in FIG. 1) is a CF substrate 21 (a counter substrate) and another one on the rear (a back surface side) is an array substrate 30 (an active matrix substrate, a component-side substrate). The liquid crystal layer 23 includes negative liquid crystals.

Figure 2:
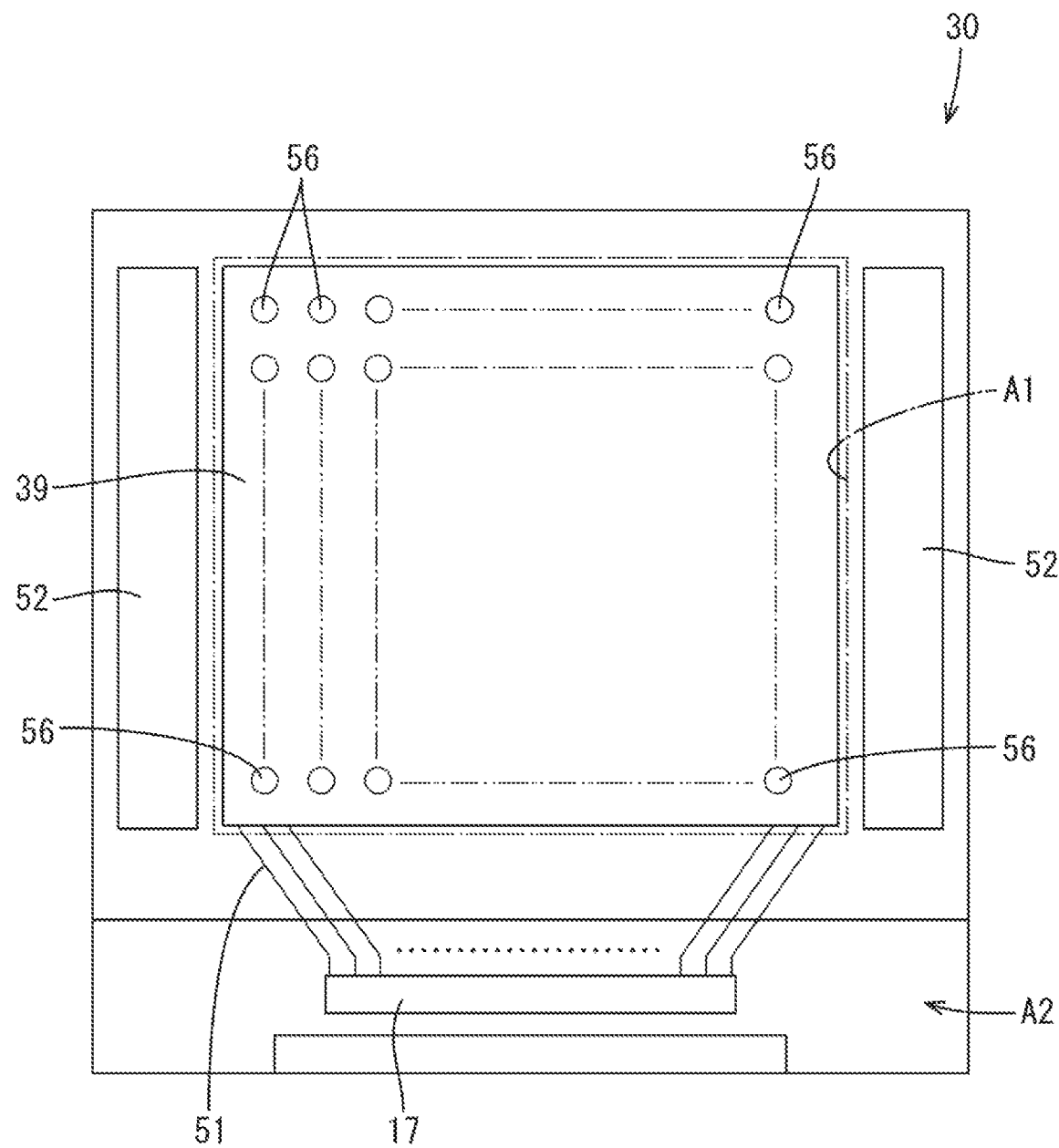
FIG. 2 is a schematic plan view illustrating an array substrate of the liquid crystal panel.
Figure 3:
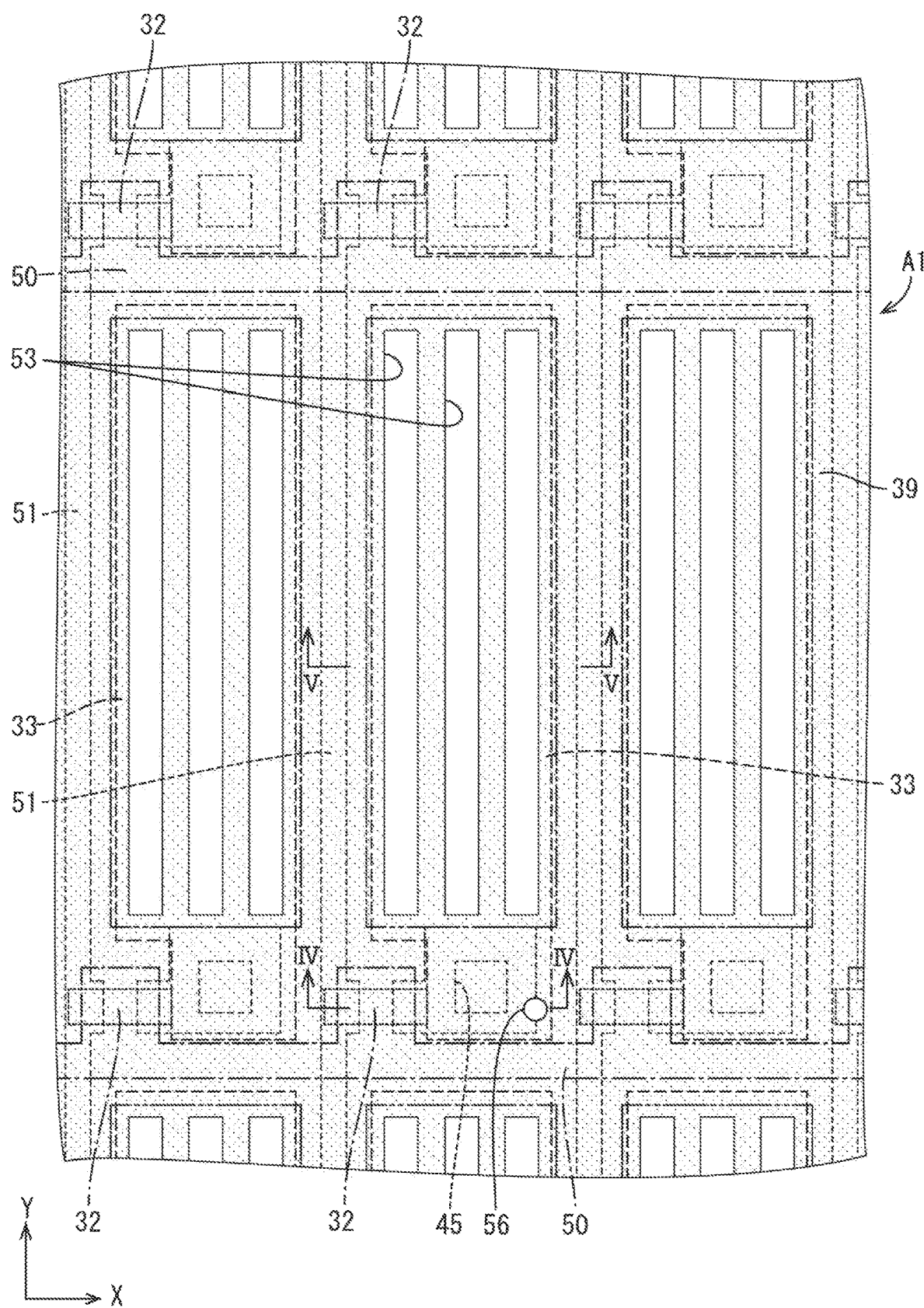
FIG. 3 is a plan view illustrating pixels of the array substrate.
Figure 4:
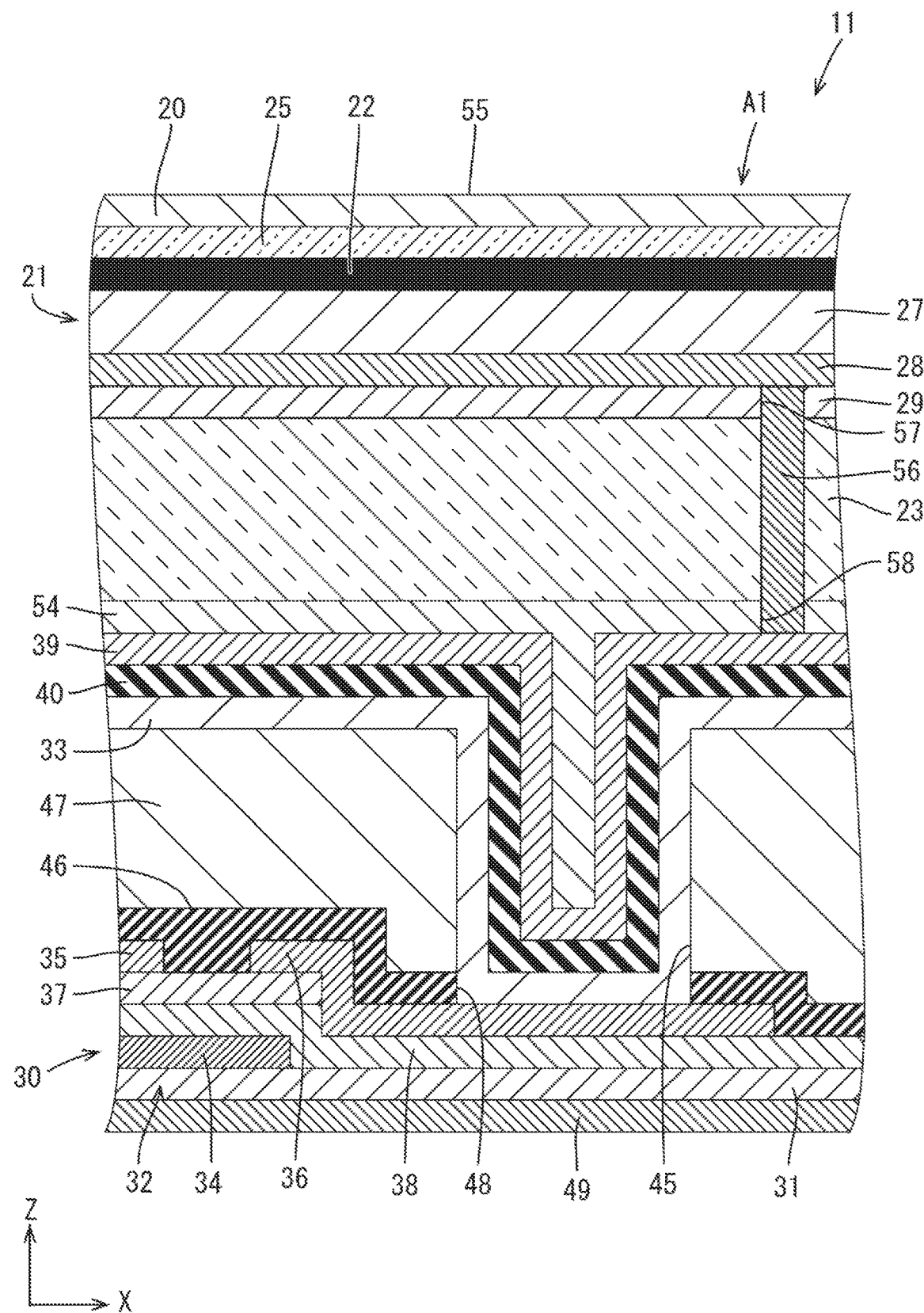
FIG. 4 is a cross-sectional view of the liquid crystal panel taken along line IV-IV in FIG. 3.

As illustrated in FIG. 2, the array substrate (a first substrate) is formed from a square glass substrate 31 and includes a driver 17 that drives the liquid crystal panel 11 on one side (a part of the non-display region A2) of the glass substrate 31. The array substrate 30 includes various types of films that are layered on an inner surface of the glass substrate 31 with the photolithography method. As illustrated in FIG. 4, a polarizing plate 49 is attached to an outer surface of the glass substrate 31. Thin film transistors 32 (TFTs: display components), which are switching components, and pixel electrodes 33 are disposed in the display region A1 and on an inner surface side (a liquid crystal layer 23 side) of the glass substrate 31. As illustrated in FIG. 3, the pixel electrodes 33 are arranged in a matrix (in rows and columns) in the display region A1.

The TFTs 32 are included in a lower layer than the pixel electrodes 33 and are arranged in a matrix (rows and columns) in the display region A1. The TFTs 32 are connected to the respective pixel electrodes 33. As illustrated in FIG. 4, the TFT 32 includes a gate electrode 34, a source electrode 35, a drain electrode 36, and a channel section 37. The channel section 37 overlaps the gate electrode 34 and a gate insulation film 38 is present between the channel section 37 and the gate electrode 34. The channel section 37 connects the source electrode 35 and the drain electrode 36. An insulation film 46 and a flattening film 47 are included in an upper layer than the channel section 37, the source electrode 35, and the drain electrode 36. The pixel electrode 33 is formed on the flattening film 47. The drain electrode 36 is electrically connected to the pixel electrode 33 through a contact hole 45 formed in the flattening film 47 and a contact hole 48 formed in the insulation film 46. The flattening film 47 (an organic insulation film) is made of organic material such as acrylic resin (for example PMMA) and has a film thickness greater than that of each of the insulation films 38, 46, 40.

Each of the gate electrode 34, the source electrode 35, and the drain electrode 36 is a multilayer film that includes titanium (Ti) and copper (Cu). However, it is not limited thereto. As illustrated in FIG. 3, gate lines 50 and source lines 51 are arranged in a grid around the TFTs 32 and the pixel electrodes 33. The gate electrode 34 is connected to the gate line 50 and the source electrode 35 is connected to the source line 51. The gate lines 50 are connected to a gate driver 52 illustrated in FIG. 2. In this embodiment, a pair of gate drivers 52 is formed monolithically on the glass substrate 31 and the gate lines 50 are connected to one of the gate drivers 52. The source lines 51 are connected to the driver 17. The TFT 32 is driven according to a signal supplied to the gate line 50 and the source line 51 from the driver 17 and according to the driving, potential supply to the pixel electrode 33 is controlled.

As illustrated in FIG. 2, the array substrate 30 includes the common electrode 39 on a front side of the pixel electrodes 33. Namely, the common electrode 39 is closer to the liquid crystal layer 23 than the pixel electrodes 33 are. An insulation film 40 is present between the pixel electrodes 33 and the common electrode 39. Each of the gate insulation film 38, the insulation film 40, 46 is a multilayer film including silicon oxide ($SiO_2$) and silicon nitride (SiNx). However, it is not limited thereto. The pixel electrodes 33 and the common electrode 39 are formed from a transparent electrode film such as indium tin oxide (ITO) or indium zinc oxide (IZO). However, it is not limited thereto. The common electrode 39 has slits 53 as illustrated in FIG. 3. When potential difference is caused between the pixel electrode 33 and the common electrode 39, which are overlapped with each other, according to charging of the pixel electrode 33, a fringe field (an oblique field) including a component in a direction normal to a plate surface of the array substrate 30 is generated between a slit opening edge of the common electrode 39 and the pixel electrode 33 in addition to a component in a direction along the plate surface of the array substrate 30. Therefore, alignment of the liquid crystal molecules in the liquid crystal layer 23 can be properly controlled with utilizing the fringe field. The liquid crystal panel 11 of this embodiment operates in a fringe field switching (FFS) mode.

An alignment film 54 is disposed to cover the common electrode 39 from the liquid crystal layer 23 side. In FIG. 3, the common electrode 39 is illustrated with shading. The common electrode 39 is connected to an extended line, which is not illustrated, at a peripheral edge portion thereof and the common electrode 39 is connected to the driver 17 through the extended line. Accordingly, the driver 17, which is a common signal supply unit, is configured to supply a common signal to the common electrode 39. The common signal supply unit is not necessarily the driver 17 but may be altered as appropriate. The extended line for supplying the common signal to the common electrode 39 may be a part of a conductive film (a gate metal) that is disposed for forming the gate lines 50 or a part of a conductive film (a source metal) that is disposed for forming the source lines 51. However, it is not limited thereto.

Figure 5:
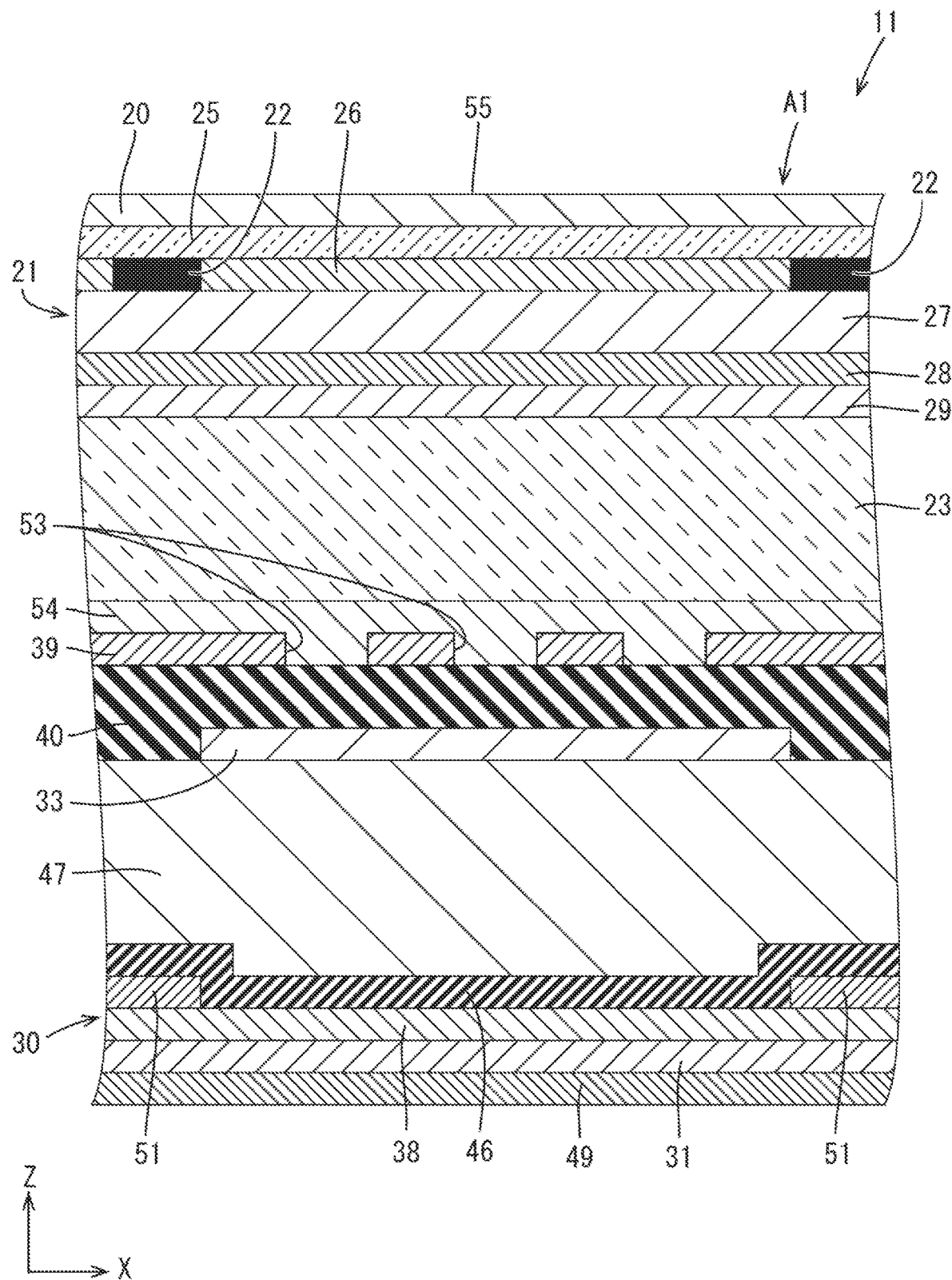
FIG. 5 is a cross-sectional view of the liquid crystal panel taken along line V-V in FIG. 3.
Figure 6:
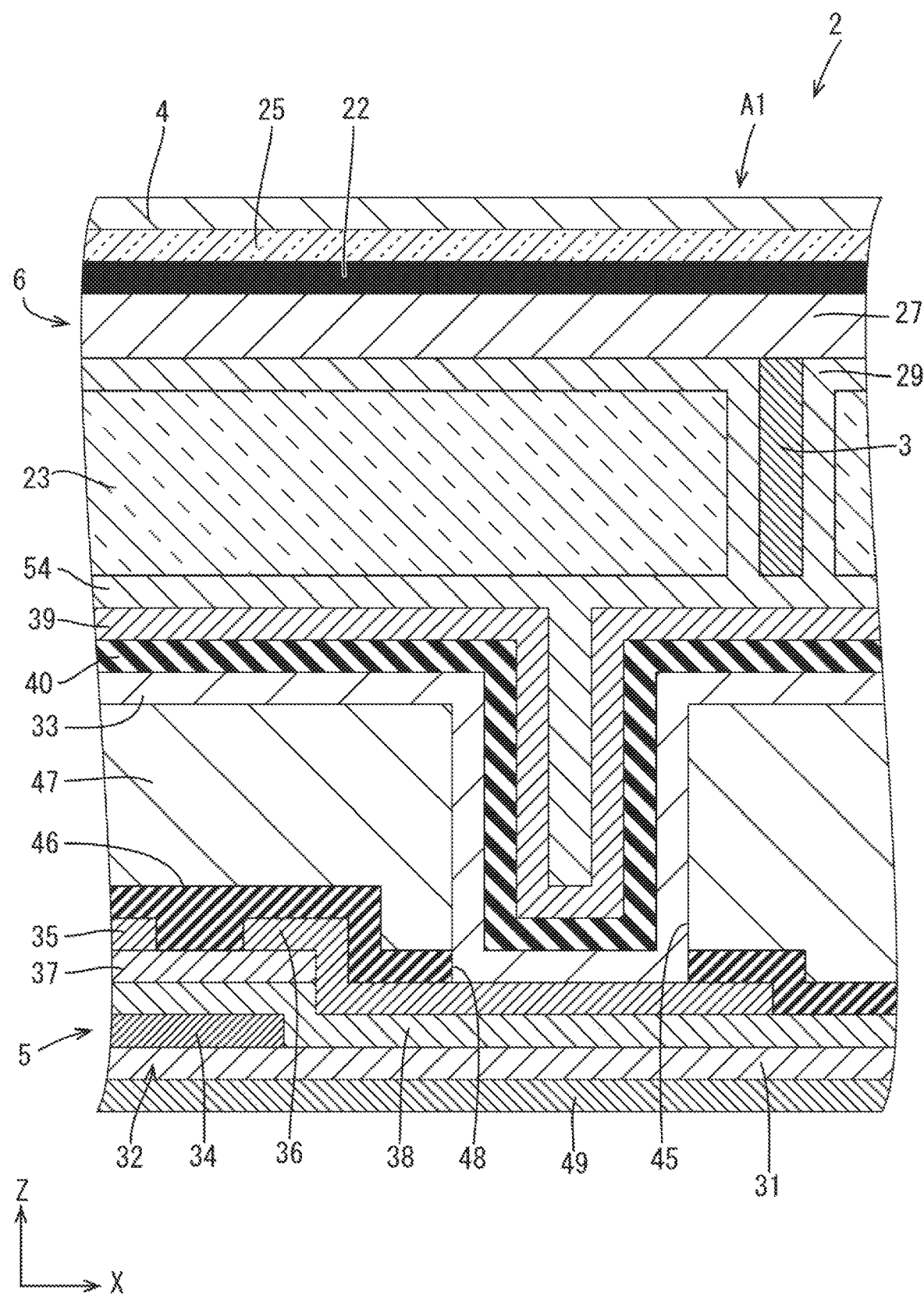
FIG. 6 is a cross-sectional view of a liquid crystal panel of Comparative Example.

The CF substrate 21 (a second substrate) is disposed opposite the array substrate 30. As illustrated in FIGS. 4 and 5, the CF substrate 21 includes a color filter 26, an overcoat film 27, a transparent electrode 28, an alignment film 29 on an inner surface side (a liquid crystal layer 23 side) of a glass substrate 25. The color filter 26 includes three color portions (two color portions are illustrated in FIG. 5) of red (R), green (G), and blue (B) that are arranged in a matrix. Each of the color portions is opposite each pixel of the array substrate 30. A black matrix 22 is included between the adjacent color portions. A polarizing plate 20 is disposed on an outer surface of the glass substrate 25. The CF substrate 21 has a surface (an outer surface of the polarizing plate 20) that is a display surface 55 on which an image is displayed. In this embodiment, the color filter 26 is covered with the transparent electrodes 28 from the liquid crystal layer 23 side. Therefore, if the color filter 26 is effectively protected only by the transparent electrode 28, the overcoat film 27 may not be included.

As illustrated in FIG. 2, the common electrode 39 of the array substrate 30 (a transparent electrode on an array substrate side) is formed in a square shape and an entire area of the display region A1 is covered with the common electrode 39. The transparent electrode 28 of the CF substrate 21 has a same shape as that of the common electrode 39 and is overlapped with the common electrode 39. Namely, the common electrode 39 is disposed to cover the entire area of the display region A1. Spacers 56 are disposed between the CF substrate 21 and the array substrate 30 to define an opposite distance between the CF substrate 21 and the array substrate 30. As illustrated in FIG. 4, the spacer 56 has a columnar shape and conductivity and is contacted with the common electrode 39 and the transparent electrode 28. Accordingly, the transparent electrode 28 is electrically connected to the common electrode 39 and functions as a common electrode on the CF substrate 21 side. The alignment films 29, 54 have through holes 57, 58, respectively, at positions corresponding to the spacers 56 such that the transparent electrode 28 and the common electrode 39 are partially exposed. As illustrated in FIG. 2, the spacers 56 are arranged in a matrix in the entire area of the display region A1. The transparent electrode 28 is electrically connected to the common electrode 39 with the spacers 56 therebetween. In FIG. 2, some of the spacers 56 are illustrated. The spacer 56 that is formed of conductive material has conductivity. The spacer 56 may be provided with conductivity by containing conductive particles such as metal particles (such as gold particles, silver particles, and copper particles) therein. As illustrated in FIG. 4, the spacer 56 is arranged to overlap the black matrix 22 so as not to adversely affect the display quality of the liquid crystal panel 11.

Next, advantageous effects of this embodiment will be described. First, a liquid crystal panel 2 according to Comparative Example illustrated in FIG. 6 will be described, in the liquid crystal panel 2, a spacer 3 has no conductivity and a transparent conductive film 4 is disposed on an outer surface of the glass substrate 25. The common electrode 39 is included only on the array substrate 5 side. The transparent conductive film 4 has a function of restricting a CF substrate 6 from being charged. In the present embodiment, the common electrode 39 and the transparent electrode 28 (the transparent electrode on the CF substrate 21 side) are connected to each other with the conductive spacer 56 such that the transparent electrode 28 on the CF substrate 21 side can be used as the common electrode. According to such a configuration, compared to the configuration including only the common electrode 39 on the array substrate 30 side, the resistance of the common electrode can be lowered.

Generally, in the common electrode, signal delay of a common signal is caused at a section far away from the extended line through which the common signal is input compared to a section close to the extended line. Therefore, a voltage distribution within a surface area of the common electrode is likely to be uneven and display quality may be lowered. Particularly, as the sheet resistivity is greater, the signal delay of the common signal is likely to be caused. In the present embodiment, the resistance of the common electrode can be lowered compared to the configuration of Comparative Example. As a result, the signal delay of the common signal that may be caused in the common electrode is less likely to be caused. Accordingly, the display quality can be further improved. Generally, as a size of the liquid crystal panel is increased, the area of the common electrode is increased and the signal delay of the common signal that is caused by the resistance of the common electrode is likely to be caused. The configuration of the present embodiment is very effective to be applied to a liquid crystal panel of a large size.

The CF substrate 21 including the transparent electrode 28 is less likely to be charged with static electricity and the alignment of the liquid crystals in the liquid crystal layer 23 is less likely to be disturbed. The configuration of the CF substrate including the transparent conductive film (the transparent conductive film 4 or the transparent electrode 28) is same in Comparative Example in FIG. 6 and the present embodiment. Therefore, the number of producing steps is same in the present embodiment and Comparative Example and is not increased in the present embodiment. The spacers 56 can be arranged as appropriate within an entire area of the display region A1. If the sealing member 24 has conductivity and connects the position detection electrode 60 and the transparent electrode 28, the common electrode 39 and the transparent electrode 28 are connected to each other at only the outer edge portions thereof. However, in this embodiment, the common electrode 39 and the transparent electrode 28 are connected as appropriate at any portions within the entire area thereof with the spacers 56.

In this embodiment, each of the common electrode 39 and the transparent electrode 28 is arranged to overlap the entire area of the display region A1. There has been known a liquid crystal panel including position detection electrodes arranged in the display region A1 as a common electrode (a so-called an in-cell type liquid crystal panel, refer a sixth embodiment described later). In the in-cell type liquid crystal panel, each of the position detection electrodes is connected to the extended line and a common signal (and a position detection signal) is supplied to each position detection electrode through the corresponding extended line. In the in-cell type liquid crystal panel, each of the position detection electrodes has an area that is smaller than that of the common electrode 39 of this embodiment. In the position detection electrode having a small area, difference in distances from the extended line to a section of the electrode near the extended line and to a section of the electrode far away from the extended line is relatively small, and signal delay of the common signal is less likely to be caused at the section far away from the extended line. In the present embodiment, one common electrode 39 covers the entire area of the display region A1. According to such a configuration, compared to the in-cell type liquid crystal panel, the area of the common electrode is increased and the signal delay of the common signal is likely to be caused at the section far away from the extended line through which the common signal is supplied. Therefore, the configuration of connecting the common electrode and the transparent electrode with the spacer is more effective to be applied to the configuration of the present embodiment including the one common electrode 39 covering the entire area of the display region A1.

The common electrode 39 is arranged closer to the liquid crystal layer 23 than the pixel electrodes 33 are. According to such a configuration, the pixel electrode 33 is not present between the common electrode 39 and the transparent electrode 28 and the pixel electrode 33 is not contacted with the spacer 56. Therefore, design flexibility of the arrangement of the spacers 56 is increased. The common electrode 39 is present between the pixel electrode 33 and the transparent electrode 28. Therefore, even if a conductive foreign obstacle enters the liquid crystal layer 23, the pixel electrode 33 and the transparent electrode 28 are less likely to be electrically connected to each other with the foreign obstacle.

The liquid crystal layer 23 includes negative liquid crystals. If the liquid crystal layer 23 includes positive liquid crystals and potential difference is caused between the pixel electrode 33 and the transparent electrode 28, the liquid crystal molecules are vertically aligned and the light transmittance is lowered. In the liquid crystal layer including the negative liquid crystals, if the potential difference is caused between the pixel electrode 33 and the transparent electrode 28, the liquid crystals are horizontally aligned and the light transmittance of the liquid crystal layer 23 is less likely to be lowered. In the present embodiment, the positive liquid crystals may be used. However, the negative liquid crystals may be preferable because of the above-described reasons.

Second Embodiment

Figure 7:
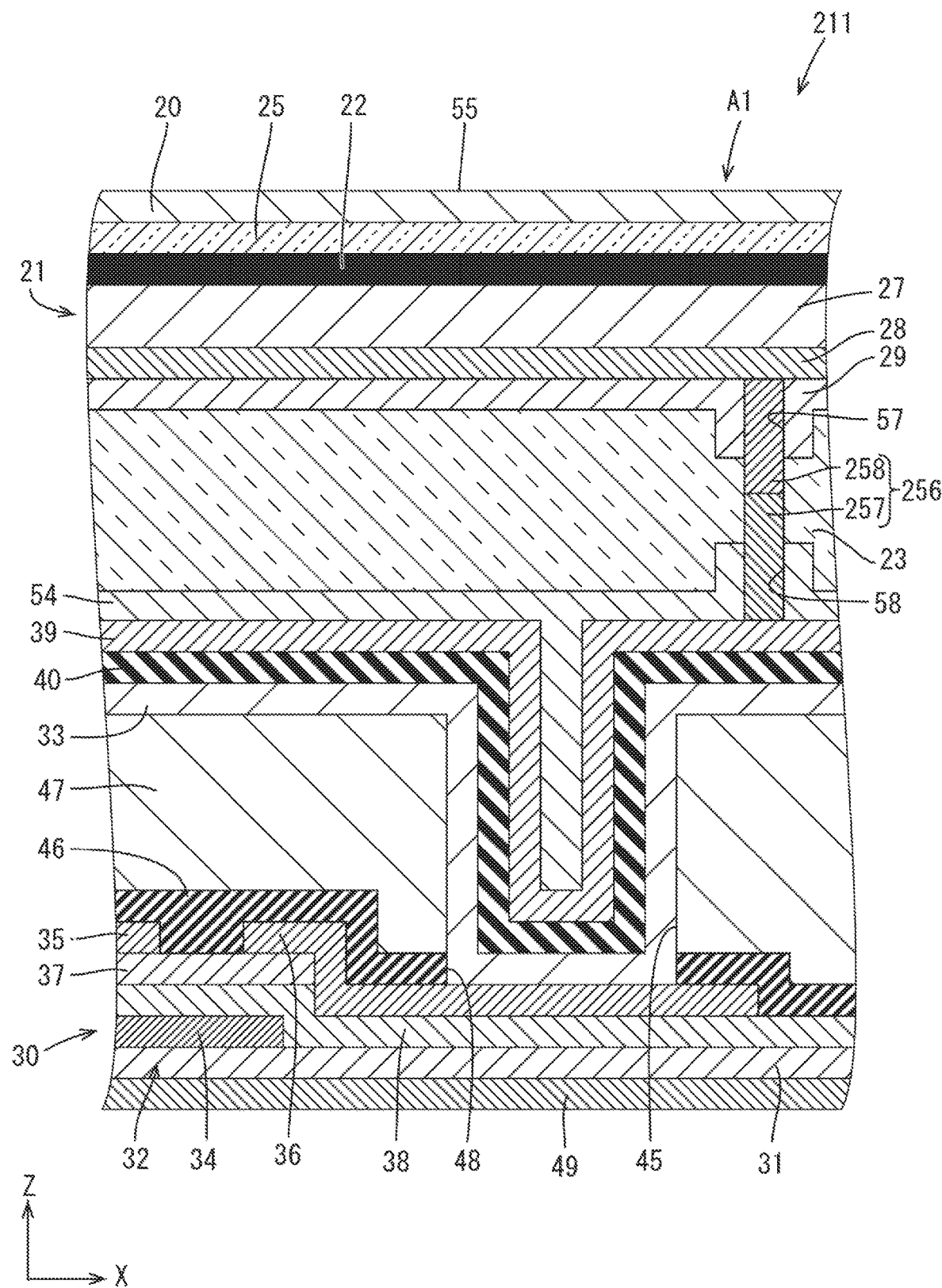
FIG. 7 is a cross-sectional view of a liquid crystal panel according to a second embodiment.

Next, a second embodiment will be described with reference to FIG. 7. Components same as those of the above embodiment are provided with the same symbols and will not be described. A spacer of a liquid crystal panel 211 of this embodiment has a configuration different from that of the above embodiment. As illustrated in FIG. 7, a spacer 256 of this embodiment includes a first projecting section 257 projecting from the common electrode 39 toward the transparent electrode 28 and a second projecting section 258 projecting from the transparent electrode 28 toward the common electrode 39 and having a projected end that is contacted with a projected end of the first projecting section 257. In this embodiment, in a process of producing the array substrate 30, after forming the first projecting section 257 on the common electrode 39, the alignment film 54 (a first alignment film between the common electrode and the liquid crystal layer) is formed. In a process of producing the CF substrate 21, after forming the second projecting section 258 on the transparent electrode 28, the alignment film 29 (a second alignment film between the transparent electrode and the liquid crystal layer) is formed.

In the configuration including the alignment film between the electrode and the liquid crystal layer, if the spacer is arranged after forming the alignment film, it is necessary to remove a part of the alignment film with etching to uncover the electrode and contact the spacer with the electrode. In the present embodiment, the electrode (the common electrode 39 and the transparent electrode 28) includes a projection (the first projecting section 257 and the second projecting section 258) such that a section of the electrode where the projection is formed is not covered with the alignment film when disposing the alignment film on the electrode. The spacer 256 is configured with a pair of projections (the first projecting section 257 and the second projecting section 258) such that an operation of removing a part of the alignment film 29 and the alignment film 54 (an operation of forming the through holes 57, 58 in the alignment films 29, 54) is not necessary.

Third Embodiment

Figure 8:
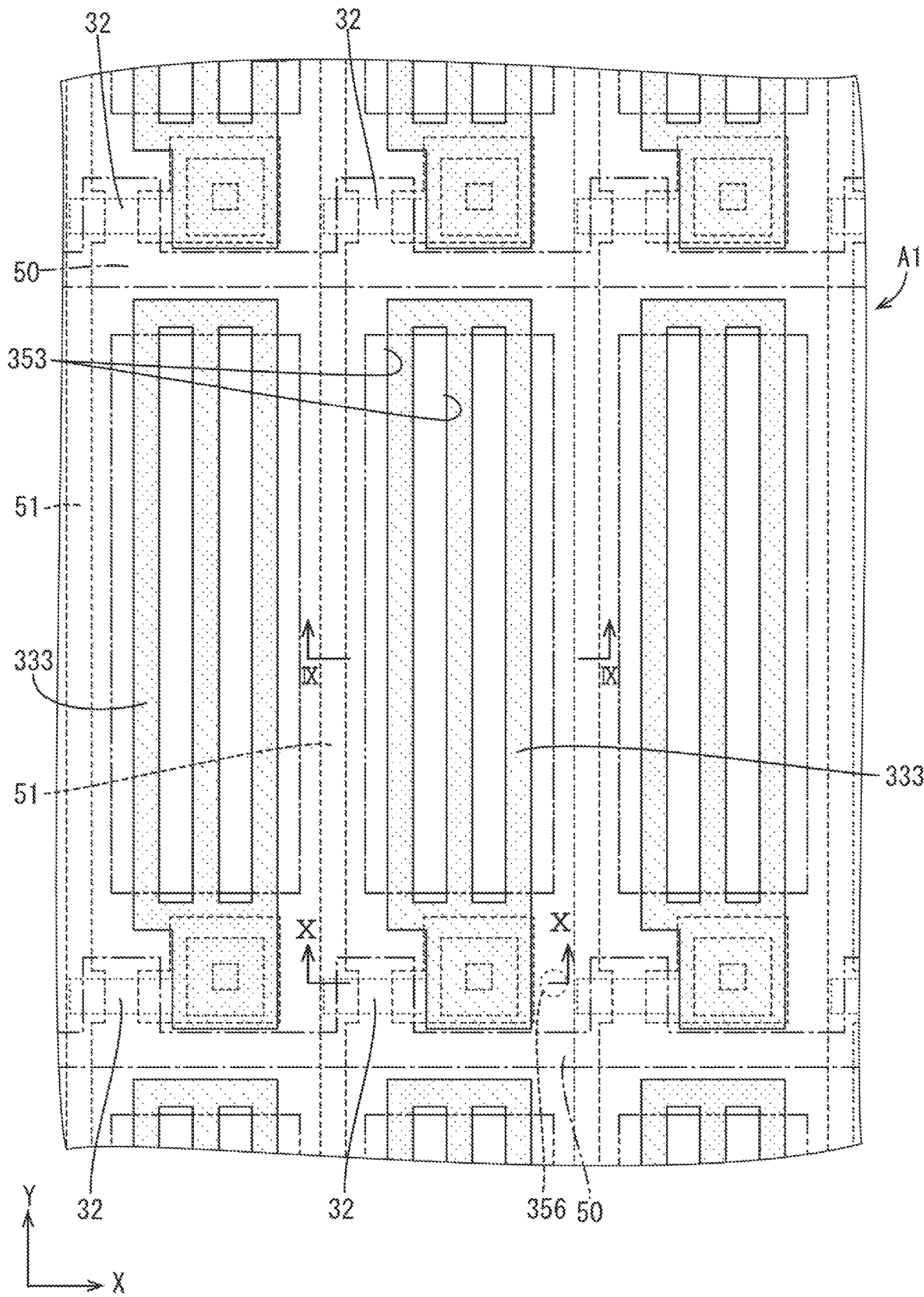
Figure 9:
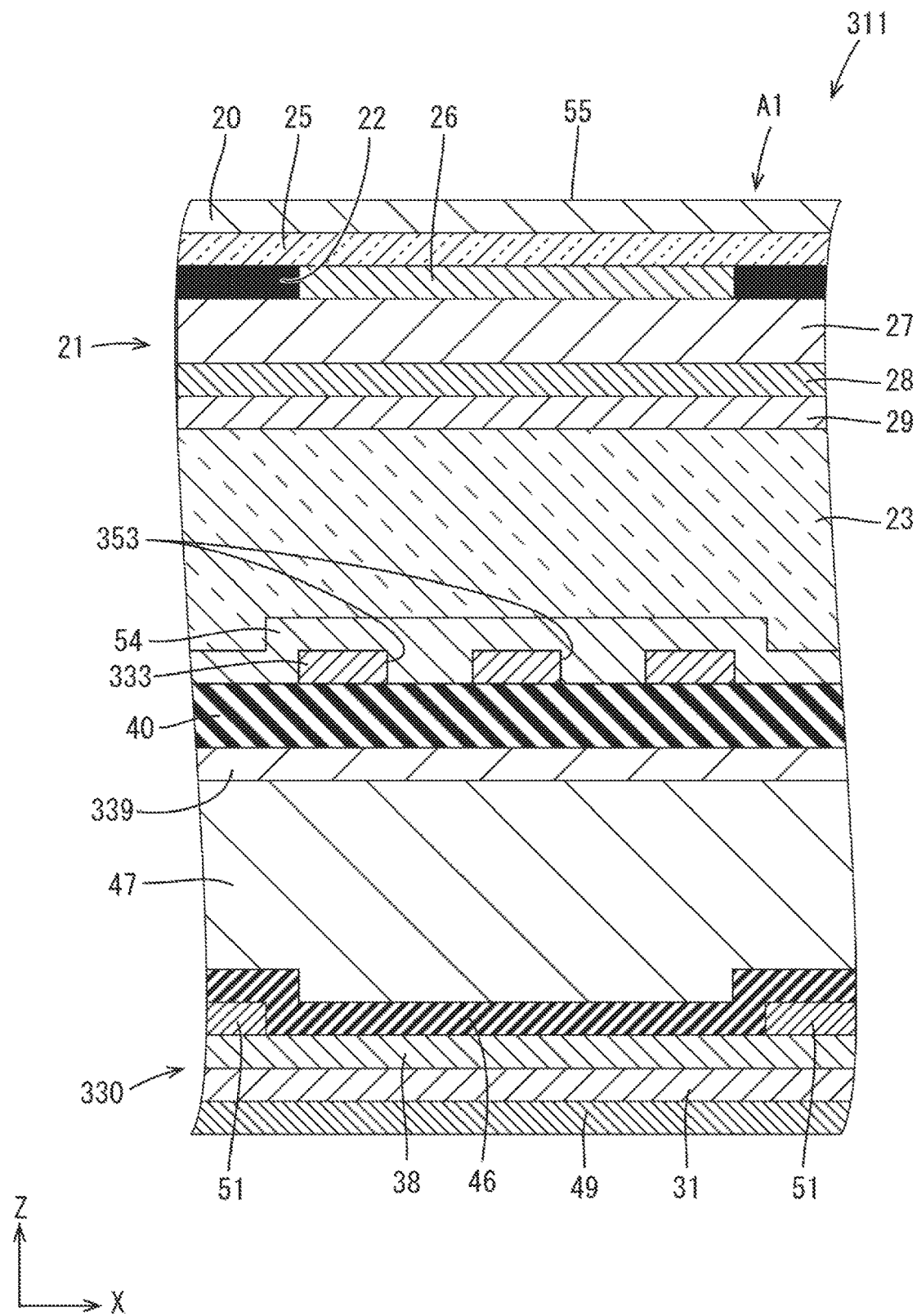
FIG. 9 is a cross-sectional view of a liquid crystal panel taken along line IX-IX in FIG. 8.
Figure 10:
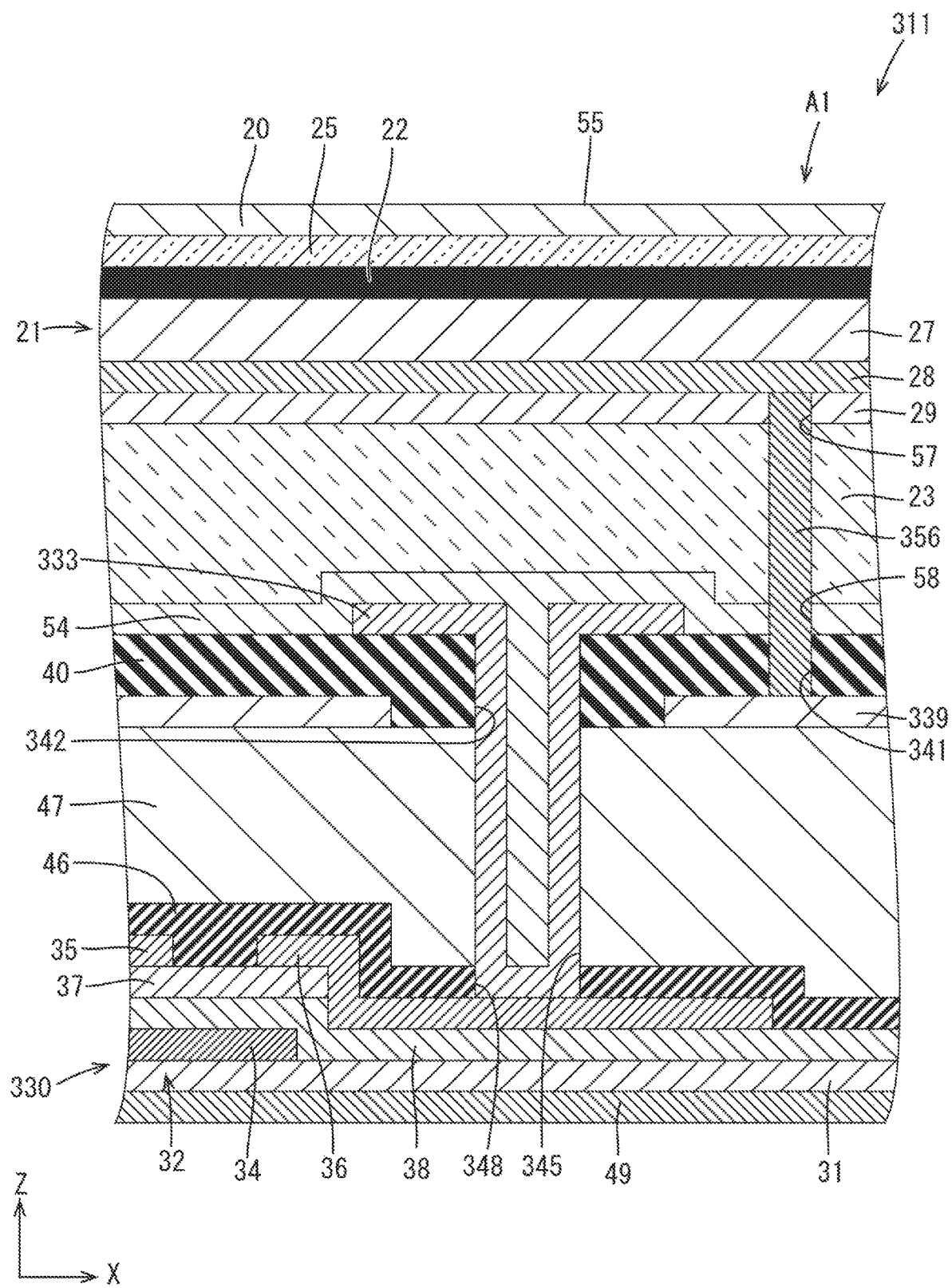
FIG. 10 is a cross-sectional view of the liquid crystal panel taken along line X-X in FIG. 3.

Next, a third embodiment will be described with reference to FIGS. 8 to 10. Components same as those of the above embodiments are provided with the same symbols and will not be described. In a liquid crystal panel 311 according to this embodiment, arrangement of the common electrode and the pixel electrode differs from that of the above embodiments. As illustrated in FIGS. 8 and 9, an array substrate 330 according to this embodiment includes pixel electrodes 333 closer to the liquid crystal layer 23 than a common electrode 339 is. The pixel electrodes 333 are connected to the drain electrode 36 through contact holes 342, 345, 348 that are formed in the insulation films 40, 46 and the flattening film 47, respectively. In this embodiment, as illustrated in FIG. 8, the pixel electrode 333 has slits 353. As illustrated in FIG. 10, a spacer 356 is contacted with the common electrode 339 and the transparent electrode 28. The alignment films 29, 54 have the through holes 57, 58, respectively, and the insulation film 40 has a through hole 341 at a portion corresponding to the spacer 356. Accordingly, the transparent electrode 28 and the common electrode 339 are partially exposed. According to this embodiment, potential difference is caused between the pixel electrode 333 and the common electrode 339 and potential difference is caused between the pixel electrode 333 and the transparent electrode 28. Thus, an electric field of greater intensity can be created compared to that created in the configuration of the first or second embodiment and light transmittance of the liquid crystal layer 23 is further increased.

Fourth Embodiment

Figure 11:
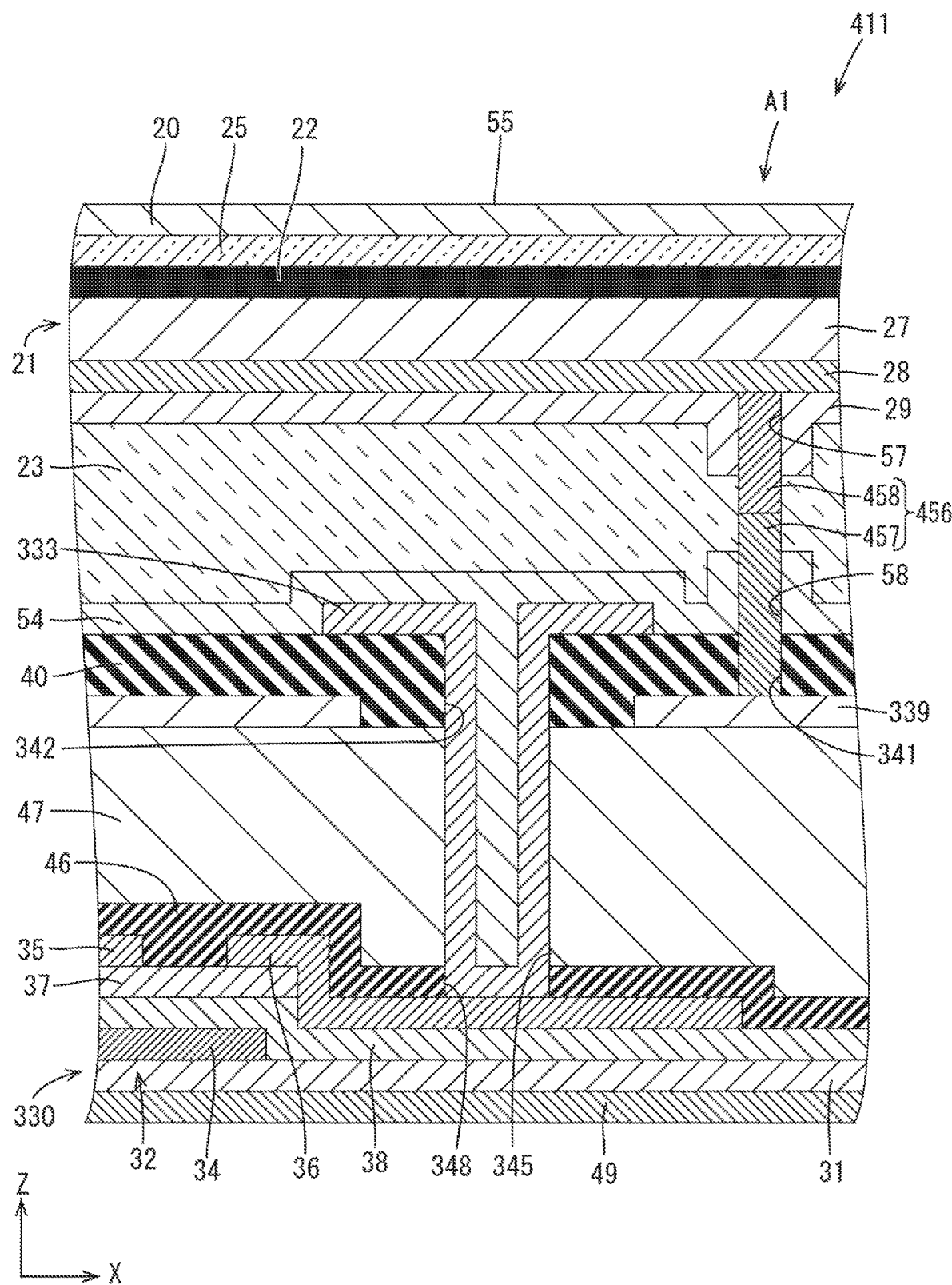
FIG. 11 is a cross-sectional view of a liquid crystal panel according to a fourth embodiment.

Next, a fourth embodiment will be described with reference to FIG. 11. Components same as those of the above embodiments are provided with the same symbols and will not be described. In a liquid crystal panel 411 of this embodiment, a configuration of a spacer differs from that of the third embodiment. As illustrated in FIG. 11, a spacer 456 of this embodiment includes a first projecting section 457 projecting from the common electrode 339 toward the transparent electrode 28 and a second projecting section 458 projecting from the transparent electrode 28 toward the common electrode 339 and having a projected end that is in contact with a projected end of the first projecting section 457, similar to the second embodiment, in this embodiment, the spacer 456 is configured with a pair of projections (the first projecting section 457 and the second projecting section 458) such that an operation of removing a part of the alignment film 29 and the alignment film 54 is not necessary.

Fifth Embodiment

Figure 12:
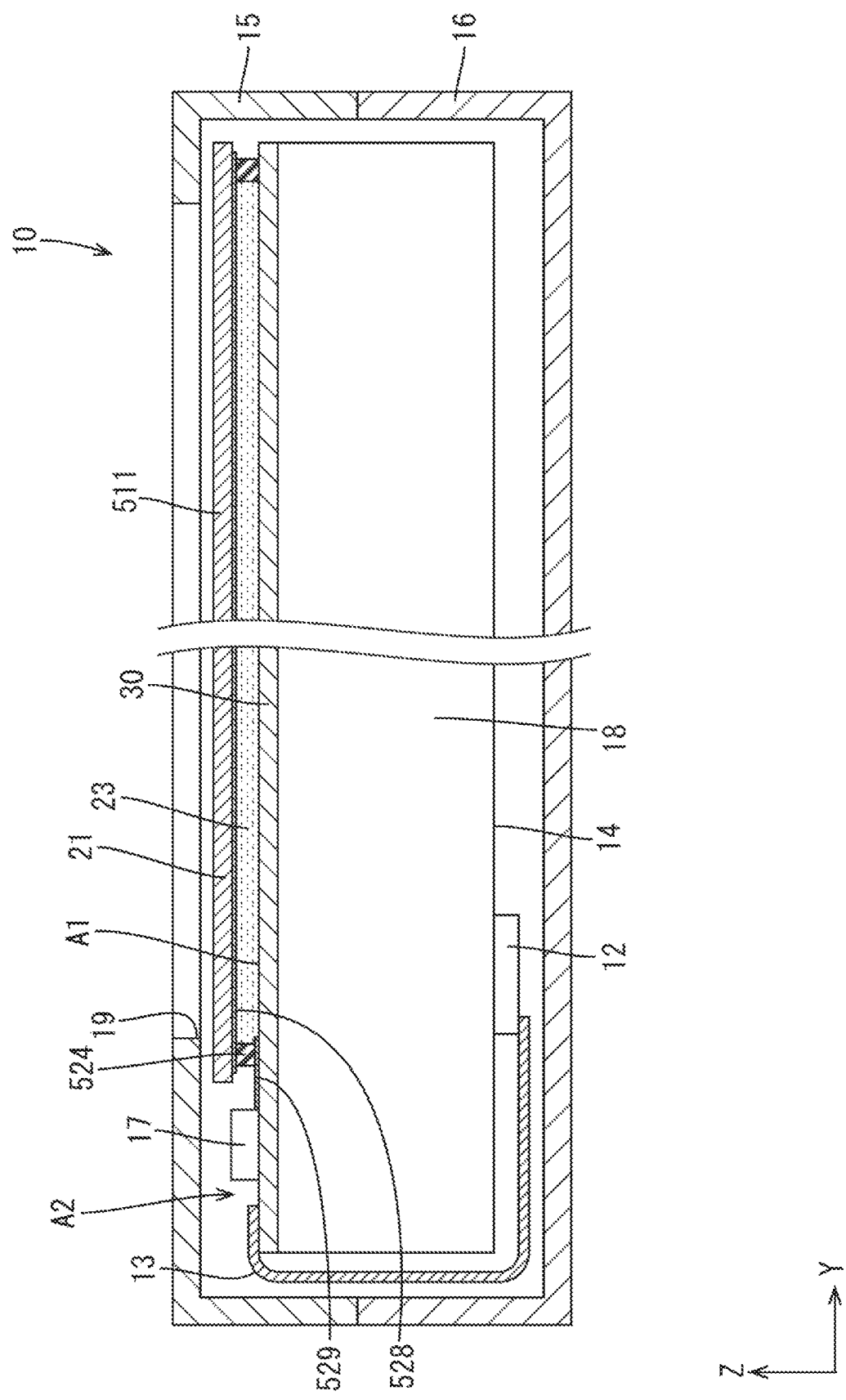
FIG. 12 is a schematic cross-sectional view illustrating a liquid crystal panel according to a fifth embodiment.
Figure 13:
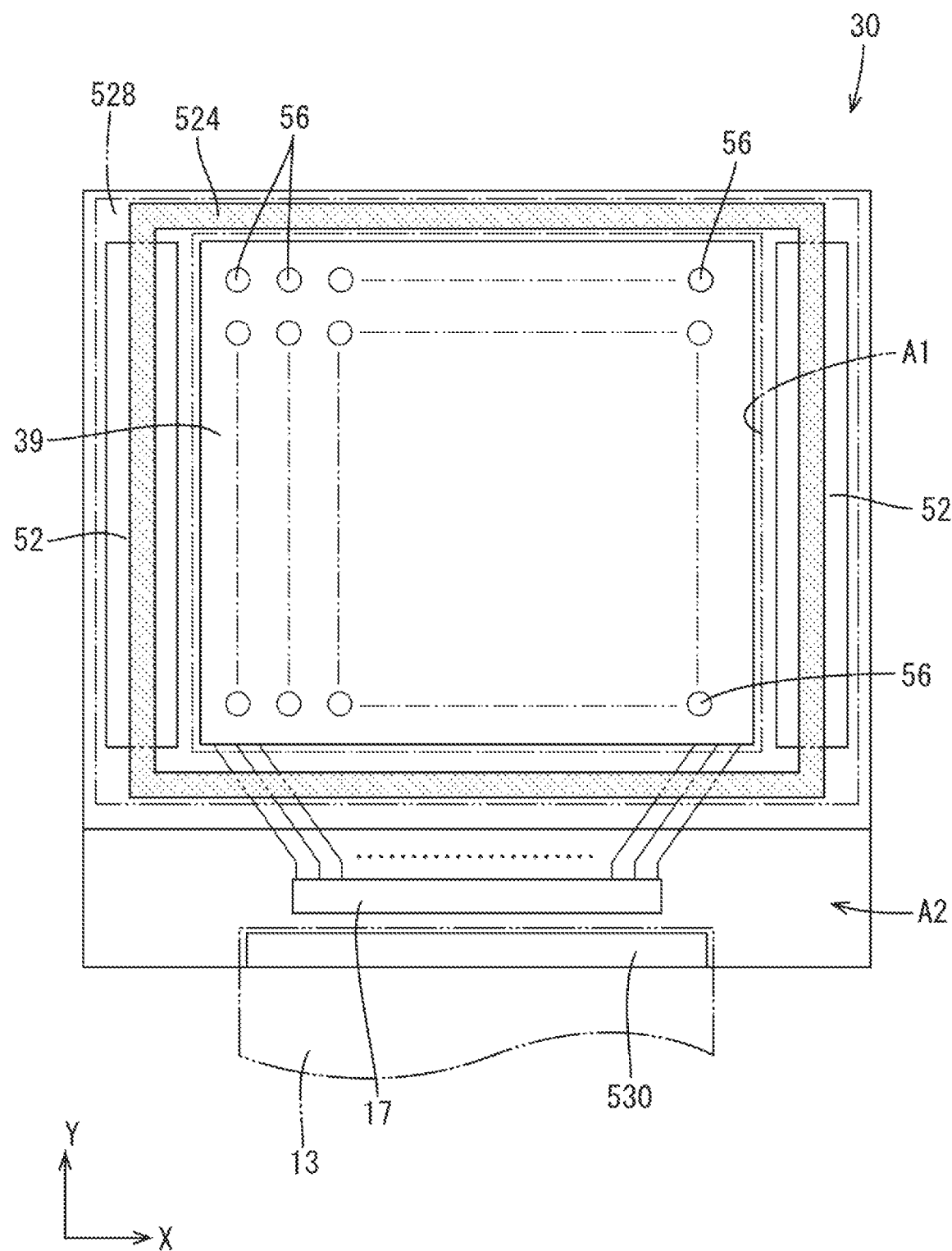
FIG. 13 is a schematic plan view illustrating an array substrate of FIG. 12.

Next, a fifth embodiment will be described with reference to FIGS. 12 and 13. Components same as those of the above embodiments are provided with the same symbols and will not be described. In this embodiment, as illustrated in FIGS. 12 and 13, a liquid crystal panel 511 includes a transparent electrode 528 that extends from the display region A1 to the non-display region A2 that is around the display region A1. Therefore, a peripheral edge portion of the transparent electrode 528 overlaps the non-display region A2. In this embodiment, a sealing member 524 that seals the liquid crystal layer 23 is in contact with the peripheral edge portion of the transparent electrode 528 (a section of the transparent electrode corresponding to the non-display region). The sealing member 524 (a conductive member) has conductivity and is disposed in the non-display region A2 and between the array substrate 30 and the CF substrate 21. The sealing member 524 may be provided with conductivity by containing conductive particles such as metal particles (gold particles, silver particles, and copper particles) therein.

As illustrated in FIG. 12, the array substrate 30 includes a line 529 that connect the driver 17 and the sealing member 524. According to such a configuration, the common signal is supplied from the driver 17 to the transparent electrode 528 through the line 529 and the sealing member 524. As illustrated in FIG. 13, the array substrate 30 has a terminal region 530 at the peripheral edge portion thereof near the driver 17. Terminals to which a flexible circuit board 13 is connected are formed on the terminal region 530. Instead of connecting the driver 17 and the sealing member 524, the terminal region 530 may be connected to the sealing member 524 such that the common signal is supplied to the sealing member 524 through the flexible circuit board 13 and the terminal region 530. A pair of gate drivers 52 is covered with the peripheral edge portions of the transparent electrode 528.

According to this embodiment, the common signal is transferred from the array substrate 30 side to the transparent electrode 528 through the sealing member 524, which is a conductive member. Accordingly, the signal delay of the common signal is further less likely to be caused compared to a configuration in which a common signal is transferred to the transparent electrode 528 only through the spacer 56. Therefore, display quality is further improved. The conductive member for transferring a common signal to the transparent electrode 528 is not necessarily the sealing member 524. However, the sealing member 524 is commonly used as the conductive member such that the number of components is less likely to be increased.

Sixth Embodiment

Figure 14:
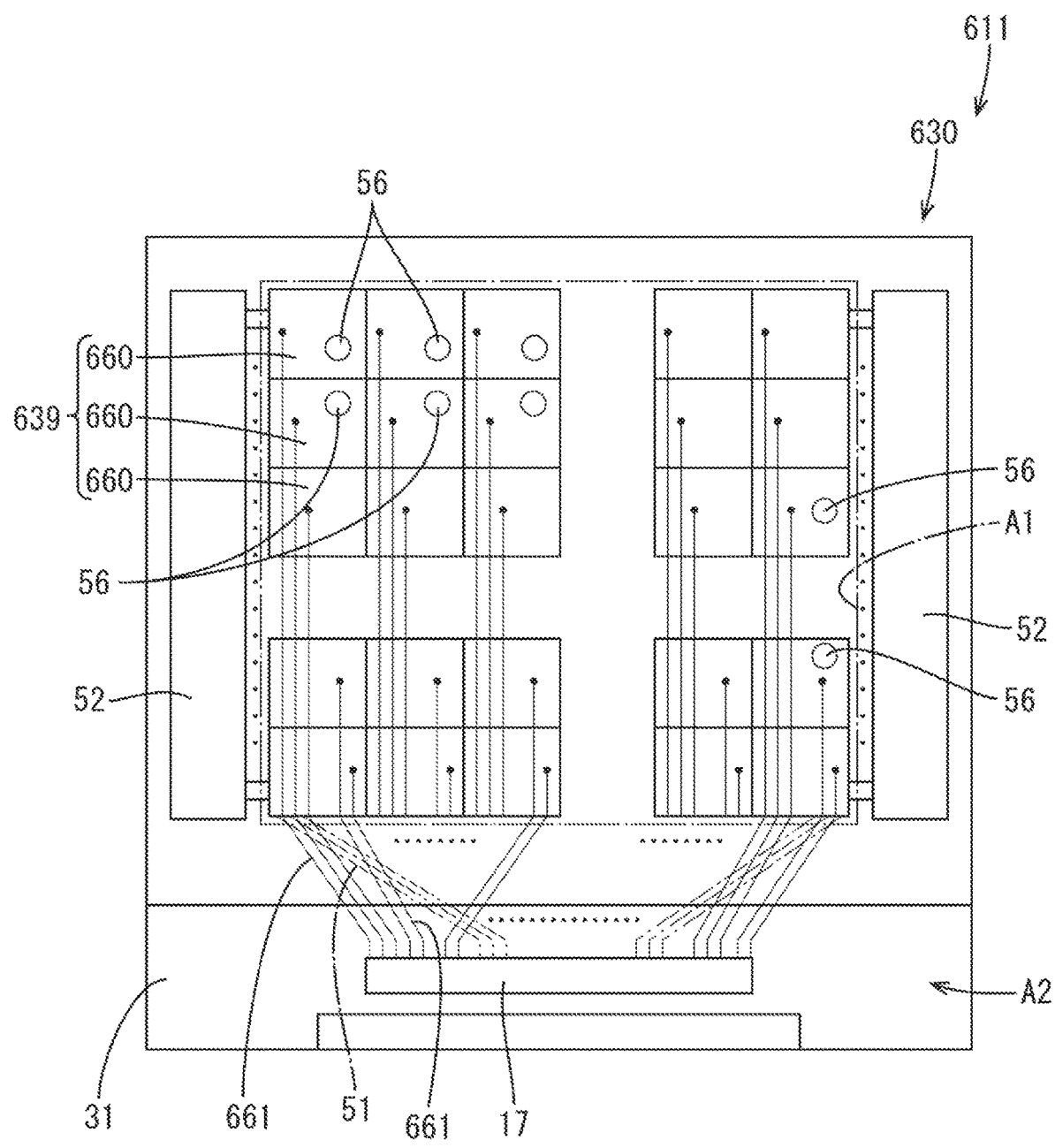
FIG. 14 is a schematic plan view illustrating an array substrate according to a sixth embodiment.

Next, a sixth embodiment will be described with reference to FIGS. 14 and 15. Components same as those of the above embodiments are provided with the same symbols and will not be described. In this embodiment, a liquid crystal panel 611 has a displaying function of displaying an image and a touch panel function (a position inputting function) of detecting a position (an input position) input by a user based on the displayed image. The liquid crystal panel 611 includes (integrally) an in-cell touch panel pattern for exerting the touch panel function. The touch panel pattern is a so-called projected capacitive touch panel pattern and a detection method of a self-capacitance type is used. As illustrated in FIG. 14, the touch panel pattern includes position detection electrodes 660 arranged in a matrix within a plate surface area of the glass substrate 31 of an array substrate 630. The position detection electrode 660 is formed from a transparent conductive film and disposed in the display region A1. In this embodiment, a common electrode 639 of the array substrate 630 is formed from the position detection electrodes 660.

The position detection electrodes 660 are connected to respective position detection lines 661. The position detection lines 661 are connected to the driver 17. The driver 17 supplies a common signal (a reference potential signal) for the display function and a touch signal (a position detection signal) for the touch function to the position detection electrode 660 at a different timing. When the position detection electrode 660 is supplied with the touch signal, a user of the liquid crystal panel 611 puts his/her finger (a position inputter), which is a conductive member, closer to a surface (a display surface) of the liquid crystal panel 611, an electrostatic capacitance is induced between the finger and the position detection electrode 660. The electrostatic capacitance detected at the position detection electrode 660 near the finger is changed according to the approach of the finger and the electrostatic capacitance detected at the position detection electrode 660 near the finger differs from that detected at the position detection electrode 660 far away from the finger. According to such difference, the input position input by the finger is detected. The common signal is transferred to all of the position detection electrodes 660 at a same timing such that all of the position detection electrodes 660 are at the reference potential and function as a common electrode 639.

Figure 15:
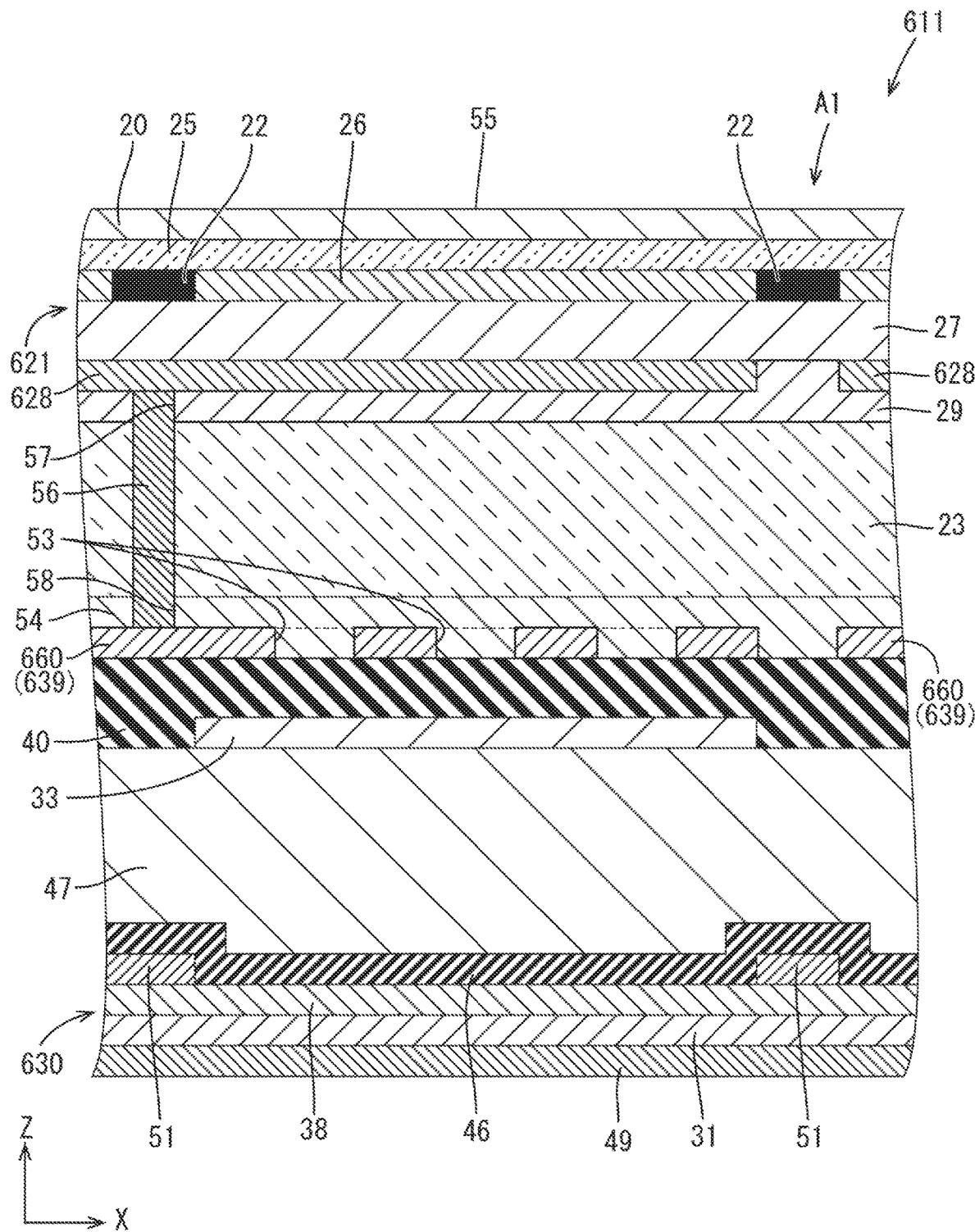
FIG. 15 is a schematic cross-sectional view illustrating a liquid crystal panel according to the sixth embodiment.

As illustrated in FIG. 15, transparent electrodes 628 on the CF substrate 621 are arranged in a matrix so as to overlap the respective position detection electrodes 660. The transparent electrodes 628 are electrically connected to the respective position detection electrodes 660 that are opposite the transparent electrodes 628 with having spacers 56 therebetween. Each of the transparent electrodes 628 is connected to a corresponding one of the position detection electrodes 660 via a corresponding one of the spacers 56. At least one spacer 56 is provided for one position detection electrode 660. In FIG. 14, some of the spacers 56 are illustrated.

The transparent electrode 628 and the position detection electrode 660 are connected to each other with the spacer 56 such that the transparent electrode 628 can be used as the position detection electrode. According to such a configuration, the transparent electrode 628, which is the position detection electrode, can be arranged closer to the position inputter (a finger) that is to be put on the display surface 55 and the position detection accuracy can be increased. According to the configuration connecting the position detection electrode 660 and the transparent electrode 628 with the spacer 56, compared to a configuration including only one of the electrodes, the resistance of the position detection electrode can be lowered and the position detection accuracy can be further increased.

Other Embodiments

The technology disclosed herein is not limited to the embodiment, which have been described using the foregoing descriptions and the drawings. For example, embodiments described below are also included in the technical scope.

(1) The operation mode of the liquid crystal panel may be a TN mode or a VA mode. When the TN mode or the VA mode is used in the configuration of the third embodiment or the fourth embodiment, the common electrode 339 that is the transparent electrode on the array substrate 330 side may be used as an auxiliary capacitance electrode for generating an auxiliary capacitance (storage capacitance) and a potential of the auxiliary capacitance electrode may be set to same as the common potential.

(2) The shape of the spacer is not necessarily a column but may be altered as appropriate. For example, the spacer may have a semi-spherical shape.

(3) The common signal may be supplied to the common electrode on the array substrate side through the spacer after being transferred to the transparent electrode on the CF substrate side.

The invention claimed is:

1. A liquid crystal panel comprising:
   a first substrate including pixel electrodes and a common electrode overlapping the pixel electrodes;
   a second substrate having a display surface displaying an image thereon and being arranged opposite the first substrate, the second substrate including a transparent electrode overlapping the common electrode;
   a liquid crystal layer disposed between the first substrate and the second substrate; and
   a spacer having conductivity and disposed in a display region where the image is displayed and disposed between the first substrate and the second substrate and being contacted with the common electrode and the transparent electrode, wherein
   the spacer includes a first projecting section projecting from the common electrode toward the transparent electrode and a second projecting section projecting from the transparent electrode toward the common electrode and the second projecting section has a projected end that is contacted with a projected end of the first projecting section, the first substrate includes a first alignment film between the common electrode and the liquid crystal layer, and the second substrate includes a second alignment film between the transparent electrodes and the liquid crystal layer.

2. The liquid crystal panel according to claim 1, wherein each of the common electrode and the transparent electrode is arranged to cover an entire area of the display region.

3. The liquid crystal panel according to claim 1, wherein the common electrode is arranged closer to the liquid crystal layer than the pixel electrodes are.

4. The liquid crystal panel according to claim 1, wherein the pixel electrodes are arranged closer to the liquid crystal layer than the common electrode is.

5. The liquid crystal panel according to claim 1, wherein the transparent electrode is arranged in the display region and extends from the display region to a non-display region that is around the display region, and the liquid crystal panel further comprising:

a conductive member arranged in the non-display region and between the first substrate and the second substrate, the conductive member being in contact with a portion of the transparent electrode corresponding to the non-display region.

6. The liquid crystal panel according to claim 5, wherein the conductive member is a sealing member that seals the liquid crystal layer.

7. The liquid crystal panel according to claim 1, wherein the liquid crystal layer includes negative liquid crystals.

\* \* \* \* \*